United States Patent [19]
Bobick

[11] Patent Number: 5,987,320
[45] Date of Patent: Nov. 16, 1999

[54] QUALITY MEASUREMENT METHOD AND APPARATUS FOR WIRELESS COMMUNICAION NETWORKS

[75] Inventor: David A. Bobick, Centreville, Va.

[73] Assignee: LLC, L.C.C., McLean, Va.

[21] Appl. No.: 08/895,874

[22] Filed: Jul. 17, 1997

[51] Int. Cl.[6] .................................................... H04Q 7/34
[52] U.S. Cl. .......................... 455/423; 455/424; 455/425; 455/501; 455/63; 455/67.1; 455/67.3; 455/67.4; 370/241; 370/249
[58] Field of Search .................................. 455/423, 33.1, 455/67.1–67.3, 54.2, 424, 425, 501, 63, 67.4; 381/48; 379/59; 375/224; 704/831; 395/2.37; 370/241–249, 336

[56] References Cited

U.S. PATENT DOCUMENTS

| | | | |
|---|---|---|---|
| 4,352,182 | 9/1982 | Billi et al. ................................ | 371/22 |
| 4,726,037 | 2/1988 | Jayant ...................................... | 375/27 |
| 4,852,169 | 7/1989 | Veeneman et al. ...................... | 381/38 |
| 4,860,360 | 8/1989 | Boggs ...................................... | 381/48 |
| 5,222,189 | 6/1993 | Fielder ..................................... | 395/2 |
| 5,490,204 | 2/1996 | Gulledge ................................. | 379/59 |
| 5,504,832 | 4/1996 | Taguchi ................................... | 395/2.1 |
| 5,621,854 | 4/1997 | Hollier .................................... | 395/2.37 |
| 5,784,406 | 7/1998 | DeJaco et al. .......................... | 375/224 |
| 5,848,384 | 12/1998 | Hollier et al. .......................... | 704/831 |

OTHER PUBLICATIONS

Article entitled "A Fast Parallel Form IIR Adaptive Filter Algorithm" by Hector Perez and Shigeo Tsujii, (pp. 2118–2122), *IEEE Transactions On Signal Processing,* vol. 39, No. 9, Sep. 1991.

Article entitled "Speech And Image Signal Compression With Wavelets" by W. Kinser and A. Langi, (pp. 368–375), Department of Electrical & Computer Engineering, University of Manitoba, *IEEE,* 1993.

Article entitled "Speech Encryption Using Discrete Orthogonal Transforms" by Dr. S. Sridharan et al., (pp. 1647–1650), School of Electrical & Electronic Systems Engineering, Queensland University of Technology, *IEEE,* 1990.

Article entitled "A Comparison Of Wavelet Deconvolution Techniques For Ultrasonic NDT" by C. H. Chen et al., (pp. 867–870), Electrical & Computer Engineering Dept., Southeastern Massachusetts University, *IEEE,* 1988.

Article entitled "Signal Design for Infinite Impulse Response Inverse Filters" by W. Wang et al., (pp. 460–464), Communications Sciences Institute, University of Southern California, Los Angeles, *IEEE,* 1993.

(List continued on next page.)

*Primary Examiner*—Dwayne D. Bost
*Assistant Examiner*—Charles R Craver

[57] ABSTRACT

An quality testing apparatus and method for providing an objective and real-time evaluation of voice quality in a wireless communication system. The system under evaluation would include a receiving and transmitting apparatus at both ends of the system. To evaluate voice quality, one apparatus transmits a TDM base band voice test signal to a receiving apparatus. The configuration of the transmitted TDM base band voice test signal permits the receiving end to synchronize a test sentence, contained within the TDM test signal, with a corresponding reference sentence stored at the receiving apparatus. After synchronization, the receiving apparatus uses a model of human hearing to objectively compare the two sentences, and based on the result, outputs an AQS ranking. In addition to voice quality, the apparatus measures SINAD, noise, distortion, and signal level of transmitted test tones and maintains a log of call progress statistics.

29 Claims, 7 Drawing Sheets

OTHER PUBLICATIONS

Article entitled "Implementation of Discrete Cosine Conversion Processors" O. V. Mikhaylova et al., (pp. 5–9), *Scripta Technica, Inc.*, 1991.

Article entitled "Critical Band Width in Loudness Summation", by E. Zwicker et al., (pp. 548–557), *The Journal Of The Acoustical Society Of America*, vol. 29, No. 5, May 1957.

Article entitled "Aural Models for Objective Measures," by Quakenbush et al., *Objective Measures of Speech Quality*, Geo. Tech., School of Elec. Eng'g (Prentice Hall 1985), Chapter 6, pp. 257–281.

Article entitled "An Adaptive Kalman Equalizer: Structure and Performance" by B. Mulgrew et al., (p. 1727), *IEEE Transactions On Acoustics, Speech, and Signal Processing*, vol. ASSP–35, No. 12, Dec. 1987.

QUALITY MEASUREMENT METHOD AND APPARATUS FOR WIRELESS COMMUNICAION NETWORKS

RELATED PATENTS

This application is related to Ser. No. 08/381,495 that was filed in the United States Patent and Trademark Office on Jan. 31, 1995, and is assigned to the same assignee.

BACKGROUND OF THE INVENTION

Field of the Invention

The present invention relates to an apparatus and method for evaluating the total quality of a wireless communication network. The apparatus and method of the present invention is particularly effective for real-time audio quality evaluation of signals transmitted in the wireless communication network.

The cellular industry requires a reliable method and apparatus for determining that the intended radio coverage for a particular system has been established. Conventionally, radio coverage is determined by physically driving to a large number of test locations within the intended coverage area and both objectively and subjectively grading the delivered audio quality at each test location.

Conventional techniques for objectively grading the delivered audio signal rely on traditional static test methods, such as determining the Signal Including Noise And Distortion (SINAD) for each test location. SINAD equals (S+N+D)/(N+D), where S is the power level of a test tone transmitted across the network with a known frequency, N is the noise level, and D is the distortion level. The noise plus distortion level (N+D) is determined by filtering the received signal with a notch filter to substantially remove the frequencies of the test tone, refiltering the signal with a wide-band filter, and then integrating the doubly filtered signal. The power level S is determined by filtering the received signal with a narrow band filter to isolate the test tone frequencies and then integrating the resulting signal. A receiver measures the total power, noise and distortion at each test location, and SINAD, which represents an indication of the relative signal purity received at each test location, is calculated from these measurements,.

SINAD is currently the standard in evaluating analog cellular networks such as the Advanced Mobile Phone Service (AMPS) employed widely in the U.S. and abroad. SINAD also correlates well with subjective Mean Opinion Score (MOS) analysis.

Mean Opinion Score (MOS) analysis requires listeners to subjectively assign a value, ranging from 1 to 5, to the received signal based on their impressions of audio quality. System evaluators sometimes use a training phase before system evaluation in order to "anchor" a group of listeners. If a training phase is not used, system evaluators use test phrases with known MOS levels to normalize listener bias. System evaluators must use a standard set of reference signals to allow comparisons between test sessions.

System evaluators frequently use MOS analysis to evaluate speech coding algorithms. One advantage of MOS analysis is that listeners are free to assign their own meanings of "good" to the processed speech, making the analysis applicable to a wide variety of distortion types. This freedom, however, also creates a disadvantage in that a listener's scale of "goodness" can vary greatly. Thus, MOS analysis is affected by both choice of listeners as well as pre-evaluation instructions. Additionally, system evaluators must pay particular attention to maintaining consistent test conditions, including: the order of presentation of the speech samples; the type of speech samples; the method of presentation; and the environmental listening conditions. Even with carefully controlled conditions, direct comparison of MOS analysis for different systems is difficult. Furthermore, MOS analysis is usually very expensive and requires more than just a few listeners.

To address the difficulties associated with MOS analysis, analysts have developed objective methods for testing analog cellular networks which also correlate well with MOS analysis results. This correlation is attainable because analog cellular systems are fairly independent of particular test signals and signal distortion effects are well known (such as additive signal level dependent white noise when no amplitude saturation occurs). These objective methods employ either a transmitted sinusoidal signal or a transmitted frequency-band limited noise signal which is then analyzed as received by a receiving unit.

Techniques, both subjective and objective, which effectively measure the performance of analog cellular systems have not proven as effective in evaluating digital cellular systems. Digital cellular systems utilize sophisticated speech coding techniques to process human speech which to date cannot adequately be assessed using known analog testing techniques. Speech coding techniques do not contain flat-spectrum quantizing distortion as do analog systems and utilize signal compression to provide data bandwidths higher than those found in analog systems. Although compression allows higher data bandwidths, it introduces types of distortion not found in analog systems and not easily measured using analog techniques.

The dynamic and nonlinear nature of digital compression (as opposed to relatively linear and time-invariant nature of analog cellular systems) introduces distortions affecting audio quality such as: long delays; bit error bursts; speech clipping; speech muting; speech gaps; and repeats of incorrect segments of speech. Moreover, fixture transmission technologies and telecommunication systems such as half-rate and wideband codecs, ATM (Asynchronous Transfer Mode) protocols, and Broadband Integrated Services Digital Networks (B-ISDN) can produce even more distortions of differing magnitudes and types that most likely also cannot readily be handled by known analog test signals and procedures.

Finally, transmission technologies for Universal Personal Telecommunications/Personal Communications Services (UPT/PCS) may require new performance measurements similar to those used for digital cellular systems because their performance is based in part on the quality of speech in the received signal.

Cellular analysts have used SINAD in digital cellular systems, as well as developed variants of SINAD, in an effort to analyze distortions in these digital cellular networks. The developed variants usually include some type of Fourier analysis to indicate frequency, phase, and amplitude distortions in addition to signal and noise measurements. Subsequently, a comparison is made between resultant error signals, which are defined as the difference between the actual received signal and the transmitted signal. However, to the extent known, these variants do not adequately assess the dynamic and nonlinear nature of digital compression described above, nor do these techniques allow real-time evaluation of the network's quality.

Therefore, not only is there a requirement in the wireless industry for new techniques for measuring distortions in digital systems, but also there is a requirement for new techniques which measure distortion objectively without constant human supervision, cheaply, and correlate well with subjectively determined results. In addition, there is a need for an apparatus and method that provides real-time evaluation of signal quality, voice quality, and overall operating quality of the wireless communication network. The overall operating quality may be evaluated by providing an apparatus that can collect call progress statistics such as, access failures, access attempts, dropped calls, etc.

SUMMARY OF INVENTION

To achieve these objectives, and in accordance with the teachings of the subject invention there is provided a quality testing apparatus comprising: a transceiver circuit, wherein the transceiver circuit receives voice test signals and audio test tone signals from a mobile test terminal, and wherein the transceiver circuit transmits voice test signals and audio test tone signals to the mobile test terminal; a voice signal generating unit, connected to the transceiver, wherein the voice signal generating unit generates a time division multiplexed (TDM) base band signal, wherein the TDM signal includes at least one human reference sentence and at least one synchronization pulse, and wherein the at least one synchronization pulse identifies a time slot containing the at least one reference sentence; a voice quality measuring unit connected to the transceiver, wherein the voice quality measuring unit objectively determines the quality of a received voice test signal by comparing the received voice signal to a series of phonetically balanced reference sentences and ranking the comparison against a predetermined set of parameters; a test tone generating unit, connected to the transceiver, wherein the test tone generating unit generates an audio test tone signal; and a signal quality measuring unit connected to the transceiver, wherein the signal quality measuring unit measures the signal quality of the audio test tone signal received from the mobile test terminal.

In another aspect the invention provides a method for testing the voice audio quality of a wireless communication network, the method comprising the steps of: transmitting a test signal from a mobile testing terminal; receiving, at a quality testing apparatus, an analog signal, wherein the analog signal corresponds to the transmitted test signal plus an RF distortion signal; converting the received analog signal to a digital signal by sampling the analog signal at a rate appropriate for real-time evaluation; synchronizing the digital signal with a corresponding reference signal; filtering the test signal with a first critical-band Infinite Impulse Response (IIR) filter bank; subtracting the filtered test signal from the synchronized reference signal to produce a difference signal; comparing the difference signal with a set of predefined parameters to objectively determine a quality ranking score; and outputting the quality ranking score.

Additional advantages of the invention will be set forth in part in the description which follows, and in part will be obvious from the description, or may be learned by practicing the invention. Both the foregoing general description and the following detailed description are exemplary and explanatory, and are intended to provide a further explanation of the invention claimed.

BRIEF DESCRIPTION OF THE DRAWINGS

The accompanying drawings which are incorporated in and constitute a part of this specification, illustrate a presently preferred embodiment of this invention and, together with the detailed description of the preferred embodiment given below, serve to explain the operation of the invention.

DESCRIPTION OF PREFERRED EMBODIMENTS

The present invention can be implement with any number of digital wireless network protocols such as, for example: (1) the digital Code Division Multiple Access (CDMA)IS-95 airlink network operated at either the 800 MHZ Advanced Mobile Phone System (AMPS) band or the 1900 MHZ PCS band; (2) the digital PCS1900 airlink standard operated in the 1900 MHZ PCS band; or (3) the digital Global System for Mobile (GSM) Communications airlink standard, usually operated in the 900 MHZ band. In addition, the present invention may also be used to evaluate the quality of wireless communication systems using analog transmission protocols, such as the Advanced Mobile Phone System (AMPS).

Figure 1:
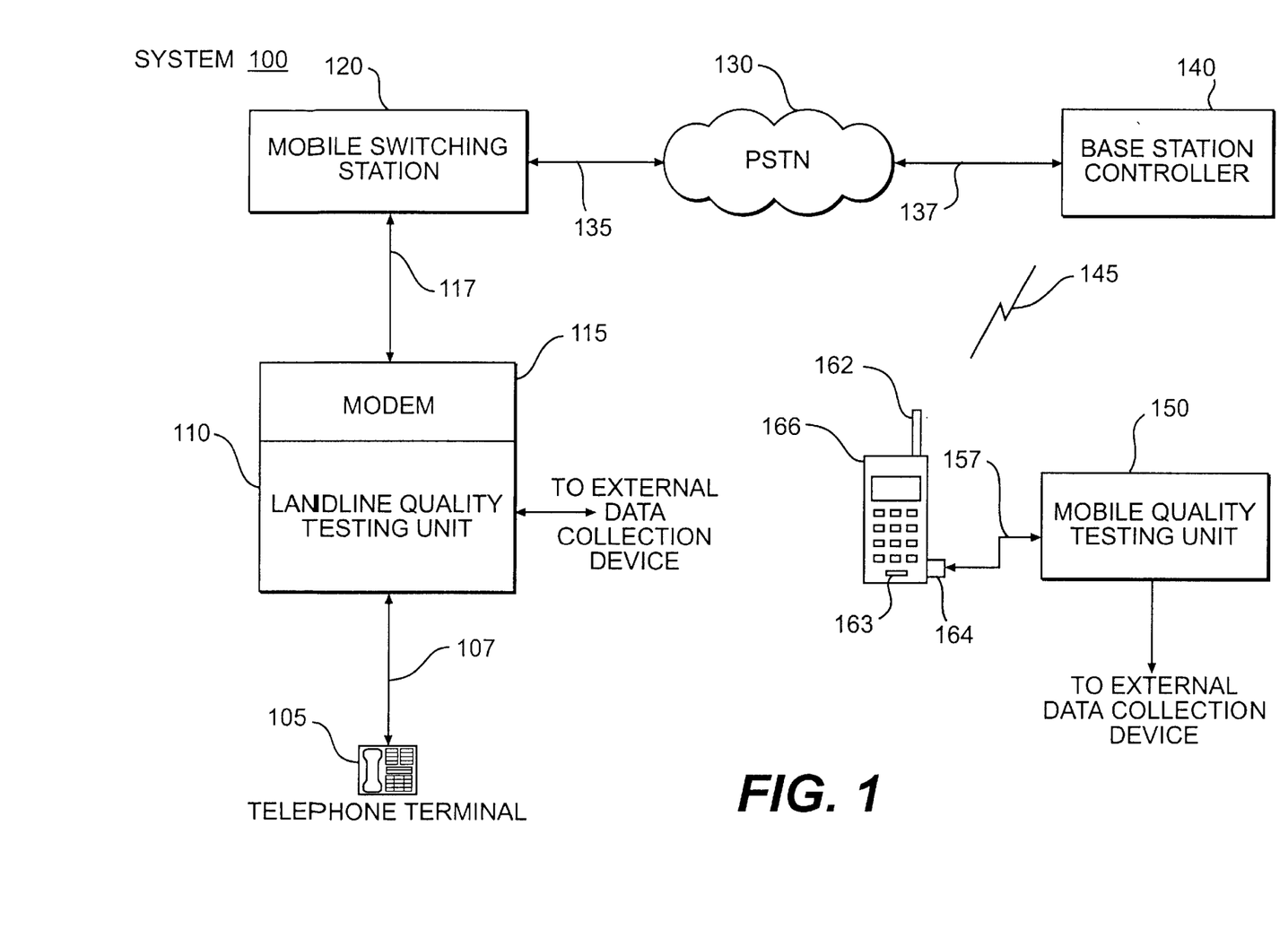
FIG. 1 is a block diagram of a wireless communication system which incorporate the teachings of the present invention.

FIG. 1 is a block diagram showing a wireless communication system 100. Preferably, system 100 includes at least one telephone terminal 105, modem 115, land-line quality testing unit (LQTU) 110 that is located at Mobile Switching Station (MSS) 120, a public service telephone network (PSTN) 130, at least one Base Station Controller (BSC) 140, Mobile Quality Testing Unit (MQTU) 150, and at least one test terminal 160.

Telephone terminal 105 is connected to LQTU 110 through standard telephone link 107 Preferably, LQTU 110 is located at MSS 120. In the alternative, however, LQTU 110 and MSS 120 may be coupled together though standard communication link 117. In either event, modem interface 115 provides the communication link between LQTU 110 and MSS 120. MSS 120 is connected to PSTN 130 via communication link 135, and PSTN 130 is connected to BSC 140 through communication link 137. BSC 140 is a standard wireless switching station for routing calls and maintaining subscriber data bases, etc. BSC 140 transmits and receives audio calls and data signals to a follow phone, or mobile telephone test terminal 160, over standard radio frequency (RF) transmission medium 145. BSC 140 preferably comprises a complete cellular phone base station or may, in the alternative, comprise some sub-portion being evaluated.

Test terminal 160 is a standard wireless telecommunication device, such as a cellular telephone. Test terminal 160 receives data and call signals via antennae 162. Test terminal 160 also has a standard audio receiver 163 for receiving audio input, i.e. voice signals from a user or test operator. Test terminal 160 also includes a serial communication port 164 for sending data signals to MQTU 150 via serial communication link 157.

Figure 2:
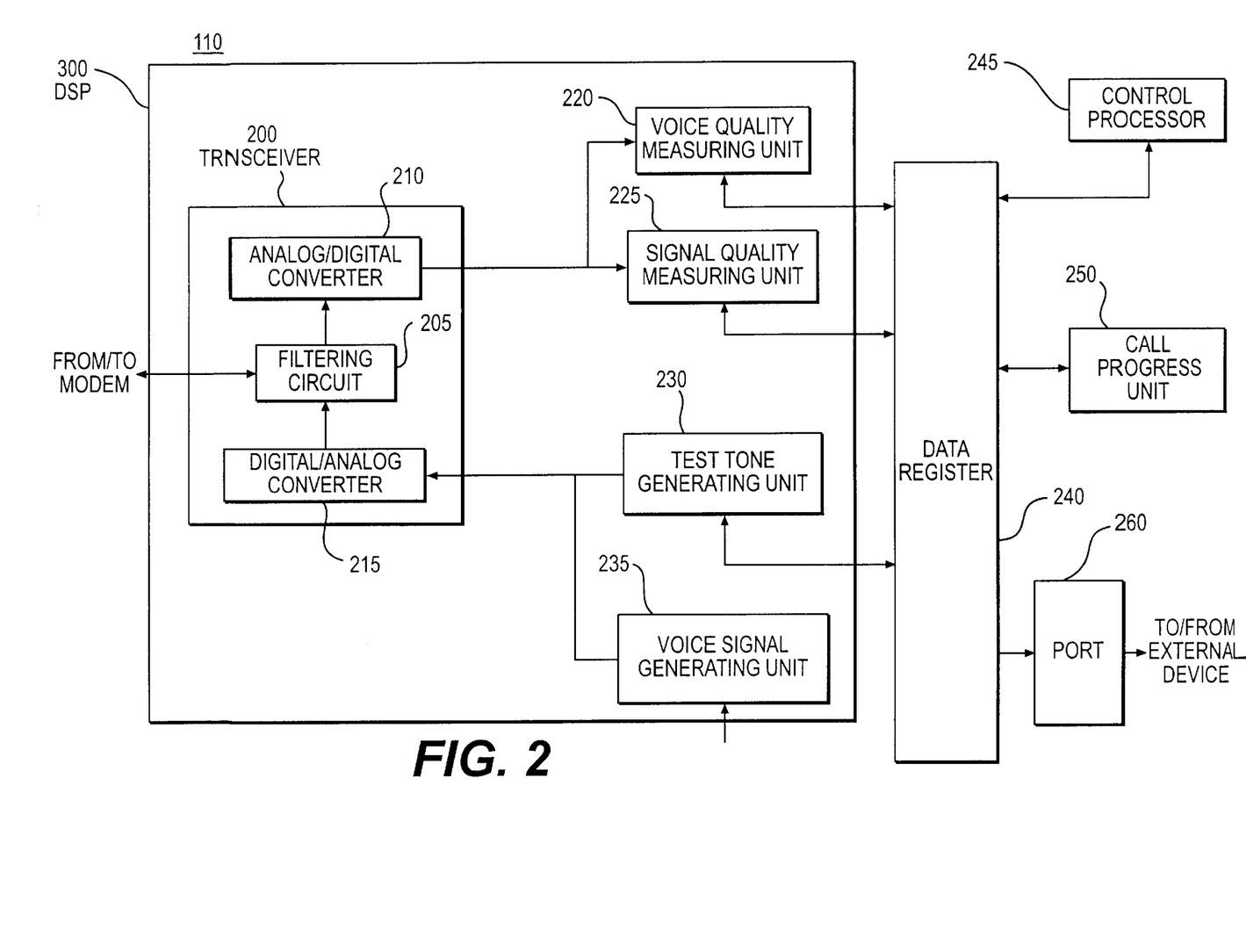
FIG. 2 is a block diagram of a quality testing apparatus for use with the system of FIG. 1.

Preferably, a test operator or system evaluator uses MQTU 150 to test the quality of system 100 by driving to various locations throughout the coverage area of system 100. The quality evaluation tests are performed through out the various service locations or cells to provide the most accurate assessment of the entire system coverage area FIG. 2 is a block diagram of LQTU 110 and MQTU 150 in greater detail. Preferably, LQTU 110 and MQTU 150 have identical hardware components and software functions capable of performing the operations of the present invention. This common architecture allows each unit to send and receive the same type of communication test signals. In the present preferred embodiment, the test signals include both audio voice test signals and audio test tone signals. In addition, the testing units' commonality allows test operators to evaluate system 100 from both the land-line and the mobile terminal side.

As seen in FIG. 2, the majority of subunits of LQTU 110 and MQTU 150 are formed by a digital signal processing (DSP) circuit 300. DSP 300 may include any DSP chip configured with the appropriate software and firmware instructions for carrying out the functions of the present invention. In addition, the DSP chip must be capable of meeting the processing speed and interface requirements of the present invention. A Texas Instrument TMS320C31, for example, operating at 31–33 MHZ with a 60 ns instruction cycle meets these requirements. Those skilled in the art will recognize the need to add peripheral components for the TMS320C31 to operate in the required manner.

DSP 300 includes a transceiver 200 for both receiving and transmitting audio voice test signals and test tone signals. For cellular environments, the signals received are preferably band limited below 4 KHz and have an input voltage of 0.25 to 5 Volts peak-to-peak. To remove distortion attributable to the RF transmission medium 145 and the various communication links, transceiver 200 contains filtering circuit 205. Filtering circuit 205 includes filtering elements for removing the distortion in both received test tone signals and voice signals.

Figure 4:
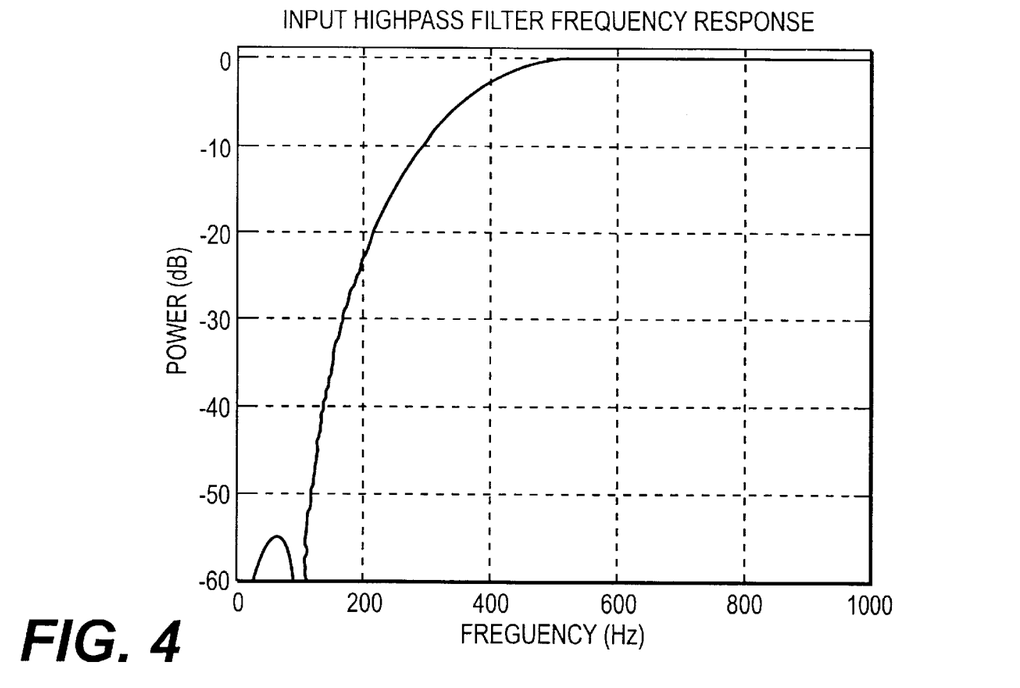
FIG. 4 shows the frequency response of an input highpass filter which may be used with the present invention.
Figure 5:
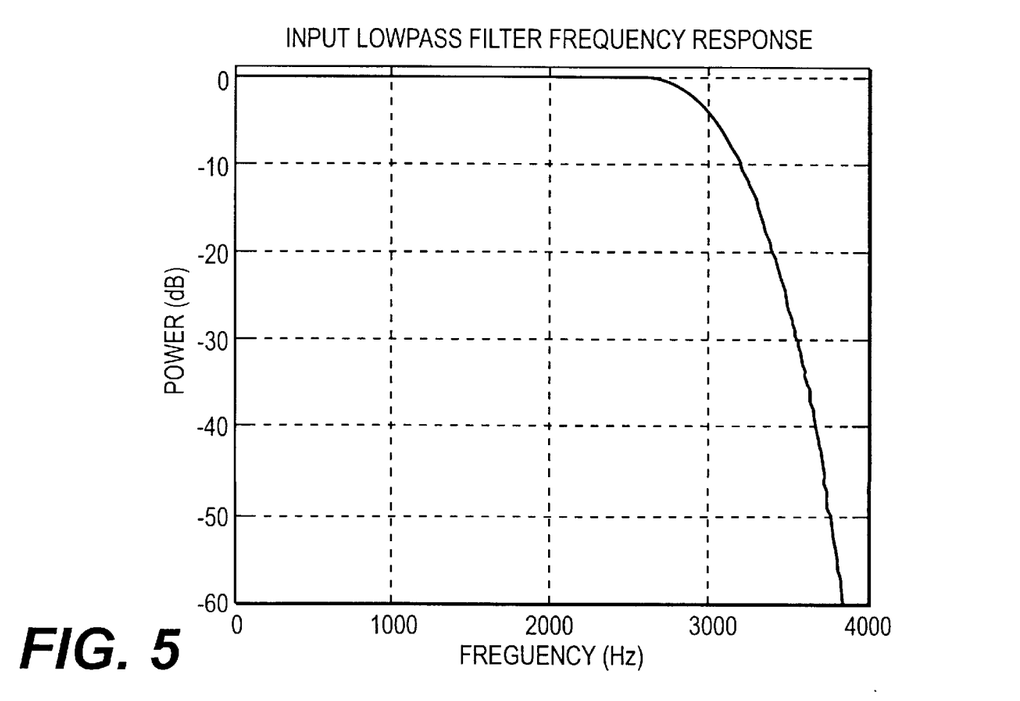
FIG. 5 shows the frequency response of an input lowpass filter which may be used with the present invention.

To filter a received voice signal, filtering circuit 205 contains a highpass filter element having a 350 Hz cutoff, with 50 dB attenuation at 80 Hz. The high pass filter design is preferably implemented as a $3^{rd}$ order elliptical IIR filter, with a frequency response detailed in FIG. 4. Filtering circuit 205 may also contain a lowpass filter element shall have a 3 KHz cutoff, with 50 dB attenuation at 4 KHz. The low pass filter design is also preferably implemented as a $3^{rd}$ order elliptical IIR filter, with the frequency response displayed in FIG. 5.

Figure 6:
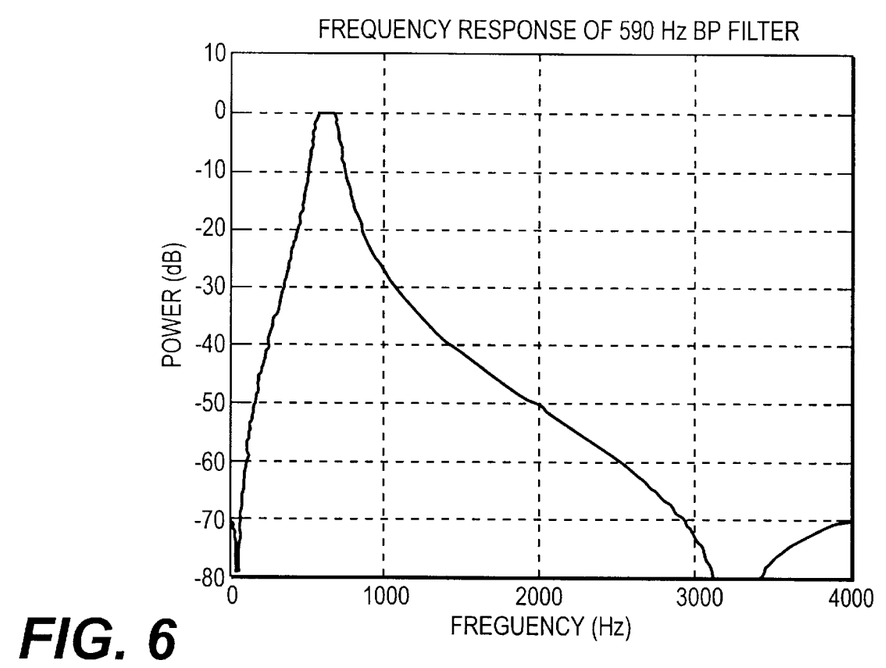
FIG. 6 shows the frequency response for a 590 Hz Tone bandpass filter which may be used with the present invention.
Figure 7:
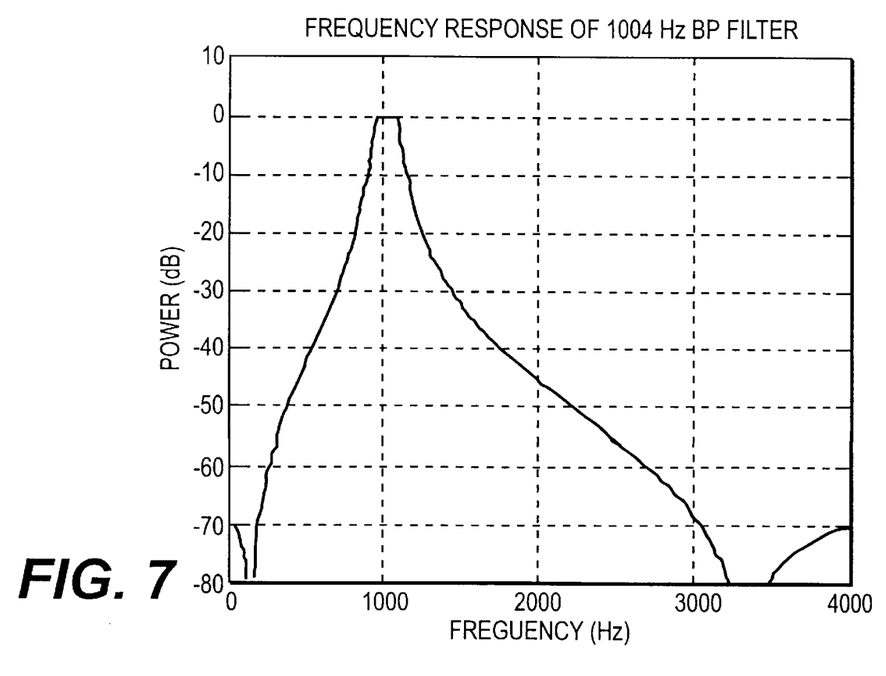
FIG. 7 shows the frequency response for a 1004 Hz Tone bandpass filter which may be used with the present invention.

To filter the received test tone signals, filtering circuit 205 contains at least two bandpass filtering elements. One element preferably has shall have a 3 dB rejection response between 904 Hz and 1104 Hz, while the other preferably has a 3 dB rejection between 490 Hz and 690 Hz. Preferably, the filters are $4^{th}$ order elliptical IIR filters, with frequency responses specified in FIGS. 6 and 7, respectively.

Transceiver 200 also includes an analog to digital converter (ADC) 210 for converting the filtered voice signals and test tone signals from an analog audio signal to a digital signal. ADC 210 converts the output of filtering circuit 205 at a sampling rate of 8 KHz or greater using the Nyquist sampling theorem that is well known in the art. The sampling rate and sampling theorem ensure that a real-time conversion of the continuously received test signals occurs.

Transceiver 200 includes a digital to analog converter (DAC) 215 for converting the digitally generated audio test tone and the voice test signal to analog representations. This conversion permits the test signals to be transmitted to the receiving testing apparatus over the appropriate RF medium 145. Preferably, DAC 215 has a conversion and sampling rate equivalent to that of ADC 210, namely 8 KHz.

DSP 300 includes a voice quality measuring unit 220 connected to transceiver 200. As explained in greater detail below, voice quality measuring unit 220 implements a mathematical model of the human ear that "listens" to the voice test signal received from test terminal 160. Voice quality measuring unit 220 uses this model to objectively determine the quality of the received voice signal by comparing the received voice test signal to a series of phonetically balanced reference sentences. Voice quality measuring unit 220 stores the series of sentences and selects a reference sentence devoid of distortion to compare against a received test sentence contained in the received voice test signal. The received test sentence is identical to the selected reference sentence but subject to distortion as a result of transmission over system 100.

Preferably, the reference sentences are a collection of eight "Harvard" sentences which are well known in the art of speech analysis. For example, one such Harvard sentence is: "rice is often served in round bowls." These sentences were developed for their combinations of phonetics and sound patterns.

Voice quality measuring unit 220 relies on these combinations to determine a difference quality of the received voice test signal by comparing it to the selected reference sentence. The output of this comparison results in a quality ranking referred to as an Aural Quality Score (AQS), which is highly correlated to a differential mean opinion score (DMOS). The AQS is the quality ranking of voiced audio signals averaged over a large population, and can objectively show the quality in accordance with a predetermined scale. For example, a voice test signal may be ranked on a progressive scale from 1–5, with 5 being "excellent," and 1 being "bad." In the present embodiment, up to eight different male/female phonetically balanced sentence combinations may be preprogrammed into the voice quality measuring unit 220.

DSP 300 also contains signal quality measuring unit 225 that measures the signal quality of a test tone signal received from the test terminal 160. Signal quality measuring unit 225, in conjunction with the filter circuit 205, measures and calculates: 1) the signal level of a received test tone in rms millivolts; 2) the noise of the test tone in rms millivolts; 3) SINAD in decibels namely, (S+N+D)/(N+D), where S is the power level of a test tone transmitted across the network with a known frequency, N is the noise level, and D is the distortion level; and 4) the signal level of a received voice signal in rms millivolts. The calculations of SINAD may be determined by methods known in the art. For example, the noise plus distortion level (N+D) is determined by filtering the received test tone signal with a notch filter to substantially remove the frequencies of the test tone, refiltering the filtered signal with a wide-band filter, and then integrating the doubly filtered signal. The power level S is determined by filtering the received test tone signal with a narrow band filter element to isolate the test tone frequencies and then integrating the resulting signal.

Preferably, the received test tone signals will have a frequency of 590 Hz and 1004 Hz. As describe above in conjunction with filtering circuit 205, the narrow band filter elements preferably will have a 3 dB rejection between 490 Hz and 690 Hz, and 904 Hz and 1104 Hz, respectively. The filters are $4^{th}$ order elliptical IIR bandpass filters, with frequency responses specified in FIGS. 6 and 7.

Figure 8:
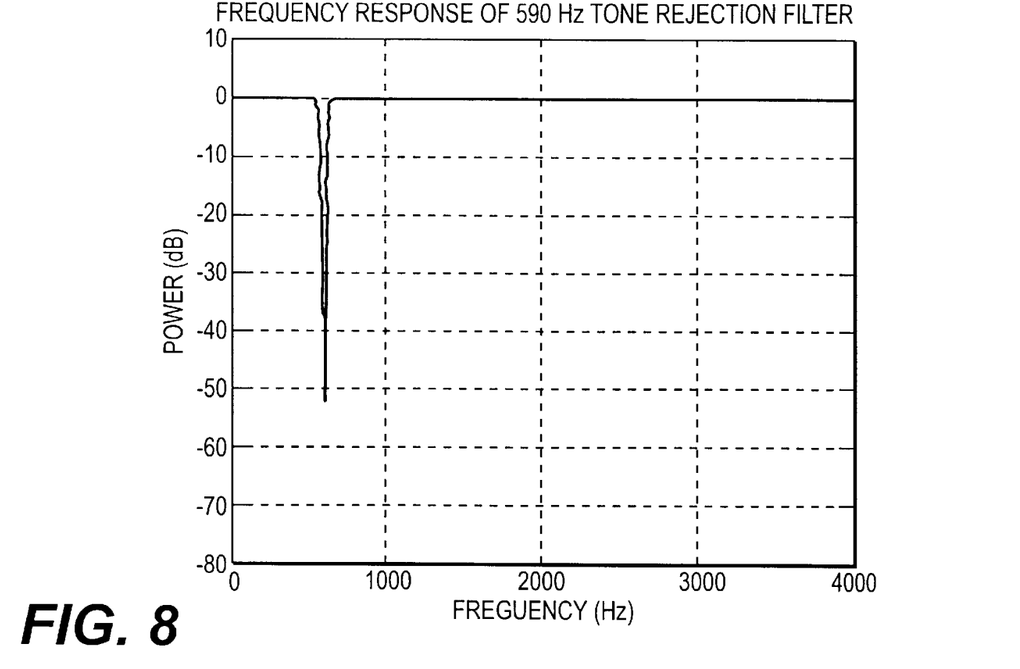
FIG. 8 shows the frequency response for a 590 Hz Tone rejection filter which may be used with the present invention.
Figure 9:
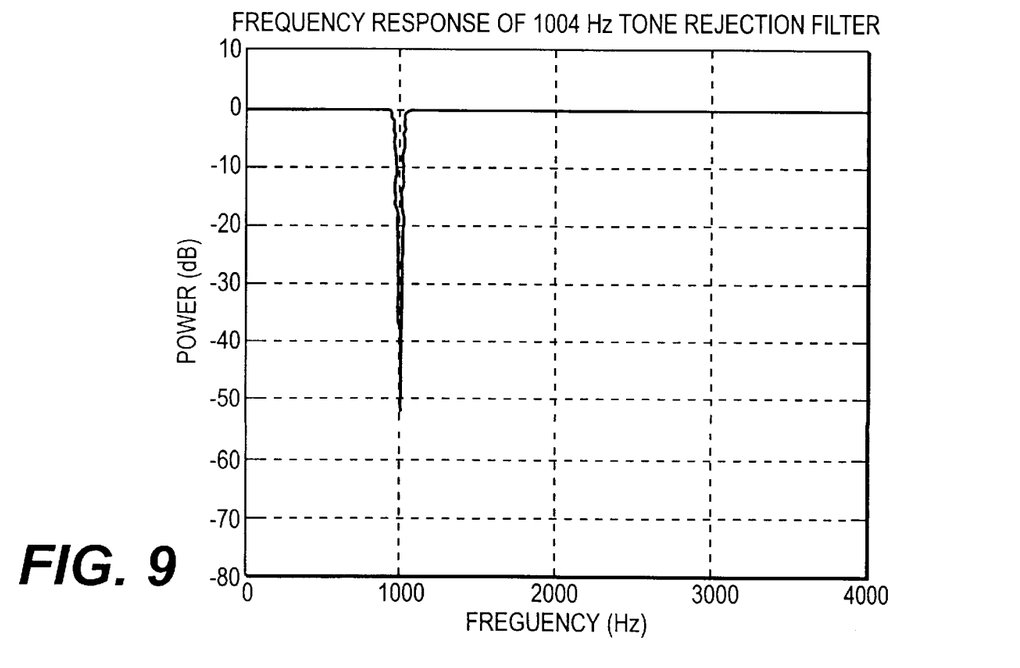
FIG. 9 shows the frequency response for a 1004 Hz Tone rejection filter which may be used with the present invention.

Filtering circuit 205, also includes a set of tone rejection filter elements that substantially remove the frequencies of the test tones for noise plus distortion measurement. As shown in FIG. 8, the filter for the 590 Hz test tone preferably will have a 50 dB rejection from 575 Hz to 605 Hz, and 3 dB points at 430 Hz and 750 Hz. As shown in FIG. 9, the filter for the 1004 Hz test tone preferably will have a 50 dB rejection from 989 Hz to 1019 Hz, and 3 dB points at 844 Hz and 1164 Hz. Both filters preferably are $4^{th}$ order elliptical filters.

The disclosed system contemplates continually measuring SINAD, signal level, noise, and distortion of a received test tone signal. Therefore, before signal quality measuring unit 225 makes a measurement, the tone rejection filter elements of filtering circuit 205 are applied to any input signals received at transceiver 200. Application of the tone rejection filters ensures that test tone signals do not interfere with any on-going test.

DSP 300 also contains a test tone generating unit 230 that generates audio test tone signals used by signal quality measuring unit 225 at the receiving test unit, LQTU 110 or MQTU 150. As described above, the test tones consist of two signals with frequencies of 590 Hz and 1004 Hz. During an audio tone test, the test tone signals are generated by test tone generating unit 230 and sent to transceiver 200. DAC 215 then converts the test tone signals to corresponding analog signals and, after filtering the analog signals through filtering circuit 205. transceiver 200 transmits the generated test tones to MSS 120 via modem 115. If the MQTU 150 is the generating unit the process is the same, except transceiver 200 transmits the signals to BSC 140 via RF transmission medium 145.

Finally, DSP 300 contains a voice signal generating unit 235 that stores and generates the reference sentences. As described above, these sentences are a collection of well known male/female phonetically balanced Harvard sentence combinations and are the same as those used by voice quality measuring unit 220 to determine the AQS of a received test voice signal.

Figure 10:
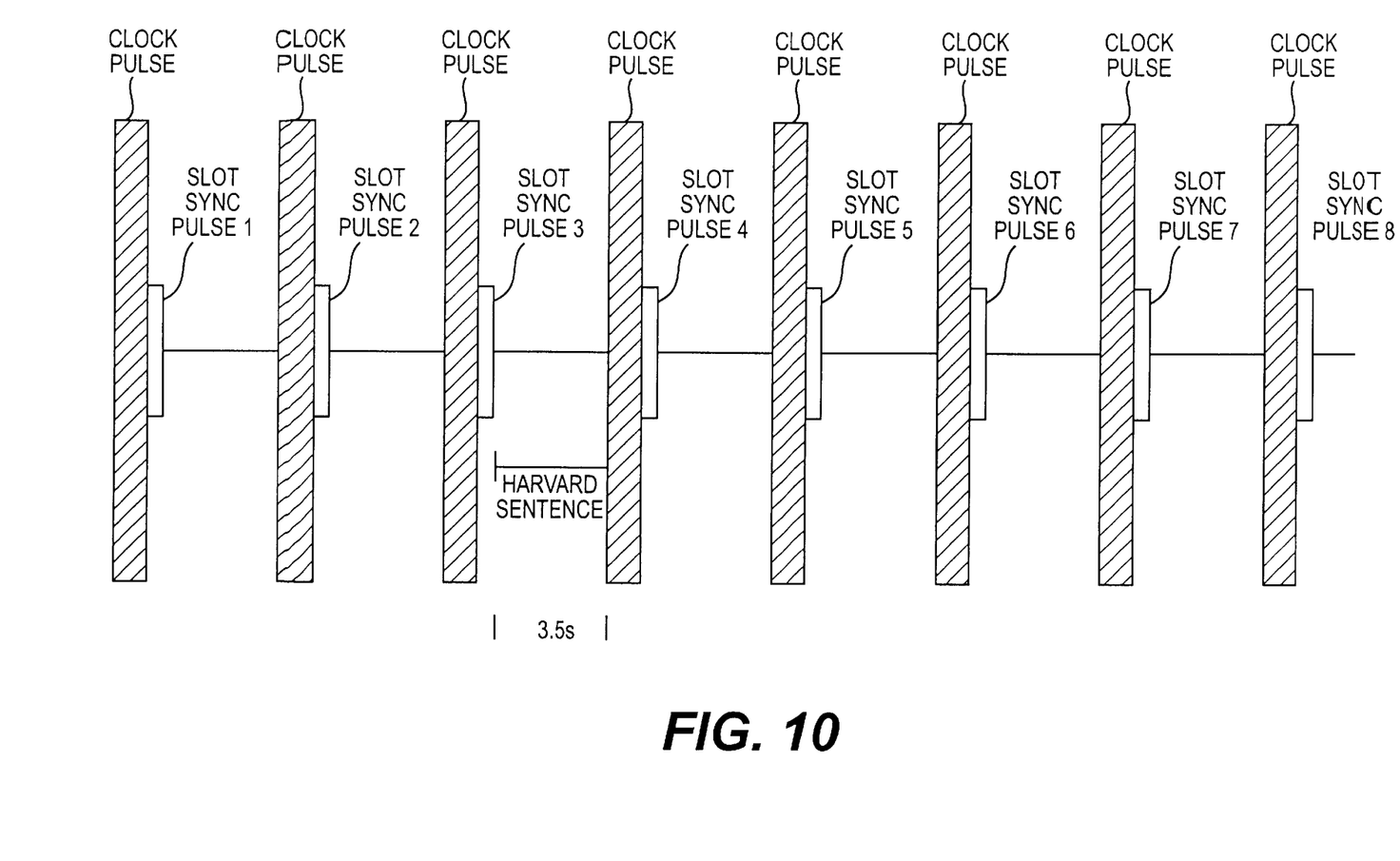
FIG. 10 shows a TDM base band signal which may be used with the present invention.

To provide the series of sentences for transmission, voice signal generating unit 235 generates a time division multiplexed (TDM) base-band signal. The TDM signal contains the sentences and synchronization pulses. For example, as seen in FIG. 10, the third time frame, or slot, of the TDM signal is shown to contain a reference sentence and an associated synchronization pulse to identify the frame and the particular sentence contained within the frame.

Preferably, the TDM signal will comprise eight TDM base-band audio slots with each slot containing a 7.5 msec, 400 Hz frame synchronization pulse, and a 3.5 sec Harvard sentence inserted after the synchronization pulse. Each frame synchronization pulse preferably is defined by the following:

Slot Frequency =k×400 Hz, where k is the slot number 1 . . . 8.

This relationship uniquely identifies the slot based on the concatenation of the 400 Hz pulses. In the present preferred embodiment, voice signal generating unit 235 shall continually transmit the TDM signal until a termination message is received.

For example, when the operator initiates the generation of the TDM signal, voice signal generating unit 235 receives an initiation command and sends the TDM signal to DAC 215. DAC 215 then converts the TDM signal to an analog signal and transceiver 200 transmits the analog signal to MSS 120 through modem 115, or to BSC 140 via RF transmission medium 145. Once the test is completed the operator may send a termination command to voice signal generating unit 235 and generation of the TDM signal will terminate.

LQTU 110 and MQTU 150 also contain data register 240. Data register 240 is a 32-bit wide VME bi-directional data exchange register that connects DSP 300 to the other components of LQTU 110 and MQTU 150. Data register 240 receives the AQS rankings from voice quality measuring unit 220, and receives the SINAD, signal and noise measurements from signal quality measuring unit 225. In addition, data register 240 transmits control signals, received from a control processor 245, to the generating units of DSP 300 to initiate test tone and voice signal generation.

Control processor 245 is an on-board processing device for providing command and control functions for the various units of DSP 300. In addition, control processor 245 will have the ability to determine the type of mobile telephone, analog or digital, being used by the test operator. Control processor 245 may be any processor unit that is capable of interfacing with data register 240 and generating the command instructions necessary to operate DSP 300. For example, an MC68000 meets the requirements of the present embodiment.

Control processor 245 determines the mode of operation of the testing units based on input signals received and commands issued from the test operator. If, for example, the operator is testing system 100 from the mobile side, she would input a voice or test tone generation command to the MQTU 150. This command, in turn, would instruct control processor 245 to initiate generation commands for voice signal generating unit 235 or test tone generating unit 230, depending on the type of test being performed. Upon receiving the commands via data register 240, voice signal generating unit 235 or test tone generating unit 230 perform the operations described above.

At the receiving end, LQTU's 110 control processor 245 sends command signals for LQTU 110's voice quality measuring unit 220 and signal quality measuring unit 225 to begin performing their respective functions when the test signals are received. While control processor 245 has been described in terms of a single component, those skilled in the art will recognize the need for peripheral components that interface with control processor 245. These components could include RAM and ROM elements, or other equivalent devices for performing data interrupts or external memory management functions.

Call progress unit 250 collects call statistics for system 100 by receiving and logging signal analysis results from the measurements of DSP 300 via data register 240. Call progress unit 250 may also rely on the AQS rankings made by voice quality measuring unit 220 to categorize a particular call. If, for example, a received voice signal is ranked with an AQS score of 2 or below, the call will be classified as "noisy," and logged as such by the call progress unit 250. In addition, call progress unit 250 keeps track of calls attempted and completed during a preset period. This feature allows evaluators to determine the overall operating quality of system 100. For example, if a call connection is successful, at either the mobile or the land-line side, call progress unit 250 categorizes the call as "good" and keeps track of each "good" call. If a call attempt results in an unsuccessful connection, call progress unit 250 categorizes the call as "bad," and logs the type of fault or message associated with the access failure. Those skilled in the art will recognized the benefit of logging statics relating to access attempts, such as Re-order/Fast Busy, Busy, Voice Announcement, No Service, Silence, etc, and those related to call failures such as Normal/Abnormal release, Call Drops, etc.

Finally, LQTU 110 and MQTU 150 each contain a communication port 260 that permits the testing unit to communicate with an external device. Preferably, port 260 will be an RS-232 communication interface and the external device will be a computer, workstation, or lap-top computer configured to interface with the LQTU 110 and MQTU 150. The device may also be equipped with software that is capable of downloading, storing, and displaying the quality measurements made by DSP 300 and call progress unit 250.

As stated above, voice quality measuring unit 220 "listens" to a received voice signal by modeling human hearing and comparing the result to a set of predefined rankings. The operation of voice quality measuring unit 220 will be described in conjunction with the method of the present invention for determining voice quality in a wireless communication network. For the purposes of instruction, the method of the present invention is described having a test operator at the mobile end that sends test messages to LQTU 110.

First, the test operator instructs MQTU 150 to output a voice test signal. As described above, this may be initiated by a command from the external device to control processor 245. For example, port 260 could receive a "voice-test start" command from the operator and send the command to control processor 245 via data register 240. Control processor 245 issues a voice test signal generation instruction to voice signal quality generating unit 235 which receives the message through data register 240. Voice signal quality generating unit 235 then generates a TDM band base test signal containing the test sentences and corresponding synchronization pulses, as described above.

Upon receiving the TDM test signal, DAC 215 and filtering circuit 205 convert the TDM signal to an RF signal for transmission over RF transmission medium 145. Upon receipt of the converted test signal, BSC 150 transmits the signal to MSS 120 via PSTN 130 and links 135 and 137.

LQTU 110 receives the test signal via communication link 117 and modem 115. LQTU's filtering circuit 205 filters the RF signal with a high pass filter element to remove the RF carrier frequency that is necessary for RF transmission. ADC 210 then converts the analog signal to a digital signal that corresponds to the TDM band base test signal originally sent by MQTU's 150 voice signal generating unit 220.

Figure 3:
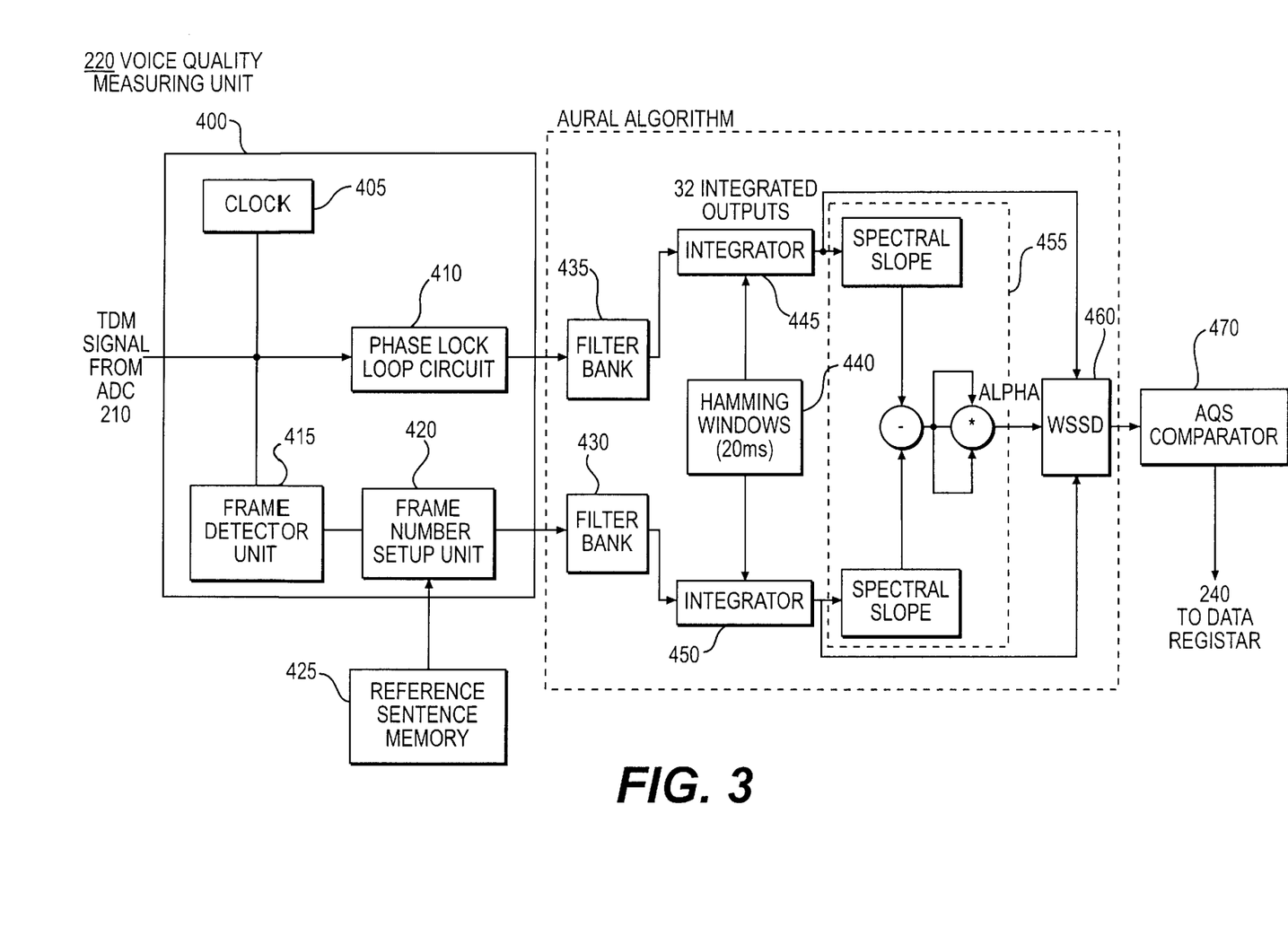
FIG. 3 is a block diagram showing greater details of the voice quality measuring unit of FIG. 2.

In the present embodiment, voice quality measuring unit 220 includes synchronization circuit 400 for synchronizing the test sentence contained in the received TDM test signal with a reference sentenced stored in memory 425 within DSP 300, as shown in FIG. 3. Alternatively, synchronization circuit 400 may comprise external components connected to voice quality measuring unit 220. In either event, to perform its function, synchronization circuit 400 includes clock 405, phase lock loop (PLL) 410, frame detector 415, and a frame number setup unit 420.

Clock 405 generates a reoccurring clock pulse that is compatible with the sampling rate of ADC 210. Preferably, clock circuit 405 will be a free running oscillator device that continually generates a pulse every 8 ms. PLL 410 uses the generated clock pulse to identify the beginning of a time frame in the periodic signal received from ADC 210. PLL circuit 410 must be capable of capturing a segment of a periodic signal and holding the segment for a specified period. In this case, the signal will be the TDM test signal received from ADC 210 which contains the test sentences and corresponding synchronization pulses previously described, and preferably, the holding period will be the length of the received test sentence.

Capturing a portion of the input voice test signal is essential for signal and voice quality measurements in wireless networks due to the nature of RF transmissions. During the testing or evaluation period, a test signal may be interrupted by artificial obstructions, such as buildings and tunnels, or by natural obstruction, such as mountains. Inevitably, these interruptions interfere with the network's evaluation or give inaccurate quality measurement results. TDM base band signal structure of the present invention allows PLL 410 to capture the received voice signal to prevent interruption of the test signal during the evaluation period.

Once PLL 410 has captured a time frame, frame detector unit 415 identifies the frame number of the captured time frame preferably by determining the frequency of the synchronization pulse within the time frame. In the alternative, the frame number could be identified by the length of the time slot, a characteristic feature in the test sentence, or other techniques recognized by those skilled in the art. As stated above, each transmitted sentence is uniquely identified by a corresponding synchronization pulse. If, for example, the synchronization pulse identified was 1200 Hz (3×400 Hz), the frame detector unit 415 would determine that the third time frame slot had been captured. Next, frame number setup unit 420 uses the identified time frame to select a sentence from the series of human reference sentences stored in memory 425. The sentence selected will have the same identifying synchronization pulse as the captured time frame, and correspond to the test sentence in the captured time frame. As will be recognized by those skilled in the art, the sampling rate of ADC 210 and the pulse from clock circuit 405 may be used to align the beginning of the respective sentences. Together, the processing speed of DSP 300, the length of test sentence (3.5 sec), and the sampling frequency of ADC 210 provide the parameters necessary to implement the real time evaluation features of the present invention.

After the test sentence and reference sentence have been synchronized, voice quality measuring unit 220 compares the two sentences using an Aural algorithm adapted for the present invention. The Aural algorithm has proven to be an effective model of human hearing, and is disclosed in Quakenbush et al., *Objective Measures of Speech Quality* Georgia Tech School of Elec. Eng'g (Prentice Hall 1985), Chap. 6, pp. 257–281.

As seen in FIG. 3, the Aural algorithm of the present preferred embodiment uses two identical filter banks 430 and 435. These banks filter the synchronized sentences and produce a matrix of integrated joint time/frequency bands. Filter banks 430 and 435 comprise 32 overlapping critical bandpass filters which preferably are $6^{th}$ order elliptical digital filters.

The frequency bands of the filters may be determined using the working model cited in E. Zwicker, G. Flottorp, and S. S. Stevens "Critical Bandwidth in Loudness Summation," Journal Acoust. Soc. Am., Vol. 29, pp. 548–557, 1975. As noted in this article, certain bands have been determined to be more relevant than others according to earlier research on the psychology of hearing. In the present preferred embodiment, the ranges of the 32 frequency bands used are shown in Table 1.

TABLE 1

| Filter No. | Start Frequency | Stop Frequency |
|---|---|---|
| 1 | 133.33 | 266.7 |
| 2 | 200.0 | 333.3 |
| 3 | 266.7 | 400.0 |
| 4 | 333.3 | 466.7 |
| 5 | 400.0 | 533.3 |
| 6 | 466.7 | 600.0 |
| 7 | 533.3 | 666.7 |
| 8 | 600.0 | 733.3 |
| 9 | 666.7 | 800.0 |
| 10 | 733.3 | 866.7 |
| 11 | 800.0 | 933.3 |
| 12 | 866.7 | 998.0 |
| 13 | 933.3 | 1070.9 |
| 14 | 999.8 | 1147.1 |
| 15 | 1070.9 | 1228.8 |
| 16 | 1147.1 | 1316.2 |
| 17 | 1228.8 | 1409.9 |
| 18 | 1136.2 | 1510.2 |
| 19 | 1409.9 | 1617.7 |
| 20 | 1510.2 | 1732.9 |
| 21 | 1617.7 | 1856.2 |
| 22 | 1732.9 | 1988.3 |
| 23 | 1856.2 | 2129.8 |
| 24 | 1988.3 | 2281.4 |
| 25 | 2129.8 | 2443.7 |
| 26 | 2281.4 | 2617.7 |
| 27 | 2443.7 | 2804.0 |
| 28 | 2617.7 | 3003.5 |
| 29 | 2804.0 | 3217.3 |
| 30 | 3003.5 | 3446.3 |
| 31 | 3217.3 | 3691.5 |
| 32 | 3446.3 | 3954.3 |

The output of the filter banks 430 and 435 represents joint time/frequency information contained in specific bands of the synchronized signals. After filtering, the power of each filter output is computed by integrating each output over a 10 ms sampling period. This sampling period and the 8 KHz conversion rate of ADC 210, permits 80 samples of the power to be obtained. This step is accomplished using integrators 445 and 450 and a standard Hamming window function 440. The resulting power signal is then normalized by dividing each power output by the total input power over the 10 ms Hamming time window. This normalized result is then converted to its log base 10 equivalent which provides a power vector signal.

Subtractor section 455 subtracts the power vector signal of the test sentence from the power vector signal of the selected reference sentence to form a first order difference signal. Subtracting section 455 then computes a spectral slope vector of the first order difference signal and the magnitude squared of the spectral slope. Subtractor section 455 then computes the average of the spectral slope magnitude squared over 0.5 sec, 1.0 sec, 1.5 sec, and 3.0 sec. intervals. The average value, alpha, is then weighted to account for variations in the frequency power of the received signal by weighted slope spectral distance (WSSD) determiner 460. These weightings may be empirically determined using the wireless environment under consideration. For example, in the presently preferred embodiment the weighting factors for a cellular environment are shown in Table 2.

TABLE 2

| Band | Weight |
|---|---|
| 1 | 1 |
| 2 | 2 |
| 3 | 1 |
| 4 | 1 |
| 5 | 2 |
| 6 | 1 |
| 7 | 1 |
| 8 | 2 |
| 9 | 2 |
| 10 | 2 |
| 11 | 1 |
| 12 | 1 |
| 13 | 1 |
| 14 | 1 |
| 15 | 1 |
| 16 | 2 |
| 17 | 1 |
| 18 | 1 |
| 19 | 2 |
| 20 | 2 |
| 21 | 2 |
| 22 | 2 |
| 23 | 2 |
| 24 | 2 |
| 25 | 1 |
| 26 | 1 |
| 27 | 1 |
| 28 | 2 |
| 29 | 2 |
| 30 | 1 |
| 31 | 2 |
| 32 | 2 |

Finally, AQS comparator 470 maps the weighted alpha value against a set of AQS parameters stored in voice quality measuring unit 220, and the resulting output score is sent to data register 240. As described above, the AQS parameters serve as an objective ranking for the voice quality of the test signal processed.

Conclusion

The present invention provides an apparatus and related method for assessing the total quality of wireless communication systems. The apparatus and method described may be used to determine signal quality including signal level, noise and distortion levels, and SINAD. The invention provides a unique TDM structure to transmit voice testing signals, and uses an Aural model algorithm to "listen" to a transmitted voice signal and determine a Aural Quality Score based on the result of the algorithm. The apparatus and method also provide real-time results for these measurements. Further, the apparatus provides a call progress statistic unit that keeps track and logs call statistics for a selected periods of time. The features of the present invention make it applicable for both digital and analog wireless networks that are presently in service. In addition, the present invention can be used to evaluate future planned networks or to test designs of digital (or analog) systems being proposed.

It will be apparent to those skilled in the art that modifications and variations may be made to the present invention. For example, the apparatus described may be configured to test more than one network at a time by adding additional ADCs and DACs to transceiver 200.

The foregoing description of the invention has been presented for purposes of illustration and description. It is not intended to be exhaustive or to limit the precise form disclosed. Modifications and variations are possible and apparent to those skilled in the art from consideration of the specification and practice of the disclosed embodiments.

The specification and examples are exemplary only, and the true scope and spirit of the invention is defined by the following claims and their equivalents.

What is claimed:

1. A quality testing apparatus comprising:
   a transceiver circuit, wherein the transceiver circuit receives voice test signals and audio test tone signals from a mobile test terminal, and wherein the transceiver circuit transmits voice test signals and audio test tone signals to the mobile test terminal;
   a voice signal generating unit, connected to the transceiver, wherein the voice signal generating unit generates a time division multiplexed (TDM) base band signal, wherein the TDM signal includes at least one test sentence and at least one synchronization pulse, and wherein the at least one synchronization pulse identifies a time slot containing the at least one, test sentence;
   a voice quality measuring unit connected to the transceiver, wherein the voice quality measuring unit objectively determines the quality of a received voice test signal by comparing the received voice signal with a series of reference sentences and ranking the comparison against a predetermined set of parameters;
   a test tone generating unit, connected to the transceiver, wherein the test tone generating unit generates an audio test tone signal;
   a signal quality measuring unit connected to the transceiver, wherein the signal quality measuring unit measures the signal quality of the audio test tone signal received from the mobile test terminal;
   a communication exchange register connected to the voice quality measuring unit and the voice signal generating unit; and
   a control processor coupled to the communication exchange register, wherein the control processor transmits either a tone generation command signal or a voice generation command signal when the apparatus operates in a generation mode, and wherein the control processor transmits a test tone measurement command signal when the apparatus operates in a measurement mode.

2. The apparatus of claim 1, wherein the transceiver circuit further includes
   an analog to digital converter (ADC) connected to the voice quality measuring unit and the signal quality measuring unit, wherein the ADC converts the received voice test signal to a first digital signal, and wherein the ADC converts the received audio test tone signal to a second digital signal; and
   a digital to analog converter (DAC) connected to the test tone generating unit and the voice signal generating unit, wherein the DAC converts the audio test tone to a first analog signal, and wherein the DAC converts the TDM signal to a second analog signal.

3. The apparatus in claim 2, wherein the ADC samples the received voice signal to ensure real-time calculations, and wherein the voice quality measuring unit further includes
   a synchronization circuit connected to the ADC, wherein the synchronization circuit synchronizes the first digital signal with one sentence in the series of reference sentences;
   a first filter bank connected to the synchronization circuit, wherein the first filter bank filters the synchronized digital signal;
   a subtractor section, coupled to the first filter bank and a second filter bank, wherein the second filter bank is identical to the first filter bank, wherein the second filter bank filters the synchronized reference sentence, and wherein the subtractor outputs a difference signal by subtracting an output of the first filter bank from an output of the second filter bank; and
   a comparator section connected to the subtractor section, wherein the comparator compares the difference signal with a set of predefined parameters and outputs a ranking based on the comparison result.

4. The apparatus in claim 3, wherein the synchronization circuit includes
   a clock circuit;
   a phase lock loop circuit connected to the clock circuit for capturing a time slot of the digital signal;
   a frame detector unit, coupled to the clock circuit and the phase lock loop circuit, wherein the frame detector unit identifies the test sentence in the captured time slot by identifying the synchronization pulse contained in the time slot; and
   a frame number setup unit, connected to the frame detector unit, for selecting a time frame, wherein the time frame selected contains at least one reference sentence and the synchronization pulse corresponding to the synchronization pulse in the captured time slot.

5. The apparatus in claim 4, wherein the voice quality measuring unit further includes a memory, wherein the memory stores a set of predefined Aural Quality Score (AQS) parameters, and wherein the comparator section compares the difference signal with the set of AQS parameters to determine an AQS ranking.

6. The apparatus of claim 1, further including
   a call progress unit connected to the communication exchange register, wherein the call progress unit collects call process statistics of the wireless system; and
   a communication port connected to the communication exchange register, wherein the communication port connects the apparatus to an external data collection device.

7. The apparatus in claim 6, wherein the external data collection device is a computer terminal and display.

8. The apparatus in claim 1, wherein the signal quality measuring unit continually measures a test tone signal level, a test tone noise level, and SINAD of the received test tone signal.

9. A method for testing the voice audio quality of a wireless communication network, the method comprising:
   transmitting a test signal from a mobile testing terminal, wherein the test signal is a TDM audio signal including a series of time slots, wherein at least one time slot contains a test sentence and an identifying synchronization pulse;
   receiving, at a quality testing apparatus, an analog signal, wherein the analog signal corresponds to the transmitted test signal plus an RF distortion signal;
   converting the received analog signal to a digital signal by sampling the analog signal for real-time evaluation;
   synchronizing the digital signal with a corresponding reference signal using the identifying synchronization pulse received with the digital signal;
   filtering the test signal with a first critical-band IIR filter bank;
   subtracting the filtered test signal from the synchronized reference signal to produce a difference signal;

comparing the difference signal with a set of predefined parameters to objectively determine a quality ranking score; and outputting the quality ranking score.

10. The method of claim 9, wherein the step of transmitting further includes generating the TDM audio signal;

converting the TDM audio signal to an RF signal; and transmitting the RF signal over a wireless transmission medium.

11. The method of claim 10, wherein the step of synchronizing the digital signal further includes capturing the at least one time slot containing the test sentence and the synchronization pulse;

identifying the test sentence contained in the captured by determining the synchronization pulse contained in the captured time slot; and selecting a reference sentence within the reference signal corresponding to the identified test sentence by matching the synchronization pulse contained in the captured time slot with a reference synchronization pulse identifying the reference sentence.

12. The method of claim 11, wherein the quality testing apparatus includes a set of input filters and a control processor, and wherein the step of receiving includes the step of filtering the analog signal with a high-pass IIR filter.

13. The method of claim 12, wherein the quality testing apparatus includes an analog to digital converter (ADC), and wherein the step of converting further includes sampling the filtered analog signal at a rate of 8 KHz or above to produce this digital signal.

14. The method of claim 13, wherein the first critical-band filter bank contains at least 32 critical band elliptical IIR filters, and wherein the step of filtering further includes the steps of outputting a filtered signal from each of the 32 filters;

computing a first power signal of each filtered signal by integrating each filtered signal over a sampling time; and normalizing the first power signal to form a power vector.

15. The method of claim 14, wherein the synchronized reference signal is processed by a second filter bank that is identical to the first filter bank, and wherein the step of subtracting includes the steps of subtracting the power vector from the a second power vector determined from the synchronized reference sentence to form a first order difference signal;

computing a spectral slope vector of the first order difference signal;

squaring the magnitude of the spectral slope vector to form a magnitude squared signal; and integrating the magnitude squared signal over a predetermined interval to produce an average signal.

16. The method in claim 15, wherein the quality testing apparatus stores a set of AQS parameters, and wherein the step of comparing includes the steps of mapping the average signal against the set of AQS parameters; and objectively determining an AQS ranking based on the mapping.

17. A wireless communication system comprising:

a land-line quality testing unit configured to test the total quality of the wireless communication system by measuring an audio quality of a received time division multiplexed (TDM) base band voice test signal and an audio test tone signal, wherein land-line quality testing unit includes a control processor configured to transmit a measurement command signal when the land-line unit operates in a measurement mode;

a modem connected to the land-line quality testing unit, wherein the land-line quality testing unit generates TDM base band voice test signals and audio test tone signals, and wherein the modem transmits the signals to a mobile switching station, and wherein the mobile switching station is coupled to a base station controller;

a mobile quality testing unit connected to a wireless mobile telephone test terminal for receiving the TDM base band voice test signal and the audio test tone signals transmitted by the modem, wherein the telephone test terminal is coupled to the base station controller, and wherein the base station controller receives the TDM base band voice test signal and the audio test tone signals from the mobile switching station; and wherein the mobile quality testing unit also transmits TDM base band voice test signals and audio test tone signals to the land-line quality testing unit via the modem.

18. The system of claim 17, further including a first data collection device, wherein the first data collection device is a computer terminal connected to the land-line quality testing unit.

19. The system of claim 17, further including a second data collection device, wherein the second data collection device is a computer terminal connected to the mobile quality testing unit.

20. The system of claim 17, wherein the land-line quality testing unit includes means for receiving an RF signal, wherein the RF signal corresponds to either the TDM base band voice test signal or an audio test tone signal;

means for converting the received RF signal to a digital signal, wherein the digital signal corresponds to either the TDM base band voice test signal or the audio test tone signal;

means for objectively determining the audio quality of the digital signal by comparing the digital signal to a series of phonetically balanced sentences and ranking the comparison against a predetermined set of parameters, and wherein the digital signal corresponds to the TDM base band voice test signal;

means for measuring the signal quality of the digital signal, wherein the digital signal corresponds to the audio test tone signal; and means for collecting call process statistics of the wireless system and providing the statistics for real-time evaluation.

21. The system of claim 20, wherein the land-line quality testing unit operates in a measurement mode, and wherein the land-line quality testing unit further includes a communication exchange register connected to the means for objectively determining the audio quality, the means for measuring the signal quality, the means for collecting and the control processor; and a communication port connected to the communication exchange register and coupling the land-line quality testing unit to the external data collection device.

22. The system of claim 20, wherein means for measuring the signal quality continually measures a test tone signal level, a test tone noise level, and a SINAD value of the digital signal.

23. The system of claim 20, wherein means for converting samples the received RF signal to ensure a real-time calculation, and wherein the means for objectively determining audio voice quality further includes
- means, connected to the means for converting, for selecting one reference sentence in the series of reference sentences that corresponds to a test sentence in the digital signal;
- means, connected to the means for selecting, for filtering the digital signal;
- means for subtracting the filtered digital signal from the selected reference sentence and continually outputting a difference signal; and
- means for comparing the difference signal with a set of predefined parameters and outputting a ranking based on the difference signal.

24. The system of claim 23, wherein the means for selecting includes
- means for generating a continuous clock signal;
- means, connected to the means for generating, for capturing a time slot of the digital signal;
- means for identifying the test sentence contained in the time slot by identifying the synchronization pulse contained in the captured time slot; and
- means for selecting a time frame, wherein the time frame selected contains a synchronization pulse corresponding to the synchronization pulse of the captured time slot.

25. The system of claim 21, wherein the means for objectively determining further includes
- means for storing a predefined set of Aural Quality Score (AQS) parameters;
- means for comparing the difference signal with the set of AQS parameters to determine an AQS ranking.

26. The system of claim 20, wherein the land-line quality testing unit further includes
- means for generating the audio test tone signal;
- means for generating the TDM base band voice test signal, wherein the TDM signal includes at least one reference sentence and at least one synchronization pulse for identifying a time slot containing the reference sentence;
- means for converting the generated audio test tone signal and the generated TDM base band voice test signal to analog representations; and
- means for transmitting the analog representations over an RF medium.

27. The system of claim 26, wherein the land-line quality testing unit operates in a generate mode, wherein the control processor transmits a generate command signal, and wherein the communication exchange register is connected to the means for generating the TDM base band signal and the means for generating the audio test tone signal.

28. The system of claim 17, wherein the land-line quality testing unit and the mobile quality testing unit are equivalent devices.

29. A method for testing the voice audio quality of a wireless communication network, the method comprising:
- transmitting a test signal from a mobile testing terminal;
- receiving, at a quality testing apparatus, an analog signal, wherein the analog signal corresponds to the transmitted test signal plus an RF distortion signal;
- converting the received analog signal to a digital signal by sampling the analog signal for real-time evaluation;
- synchronizing the digital signal with a corresponding reference signal using an identifying synchronization pulse received with the digital signal;
- filtering the test signal with a first critical-band IIR filter bank;
- subtracting the filtered test signal from the synchronized reference signal to produce a difference signal;
- comparing the difference signal with a set of predefined parameters to objectively determine a quality ranking score; and
- outputting the quality ranking score.

* * * * *